United States Patent
DeWeert

(10) Patent No.: US 11,290,363 B2
(45) Date of Patent: Mar. 29, 2022

(54) METHOD FOR SELF-LOCALIZING OF AN AD HOC NETWORK OF IN-WATER SYSTEMS

(71) Applicant: BAE Systems Information and Electronic Systems Integration Inc., Nashua, NH (US)

(72) Inventor: Michael J. DeWeert, Kaneohe, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/835,887

(22) Filed: Mar. 31, 2020

(65) Prior Publication Data

US 2021/0306248 A1 Sep. 30, 2021

(51) Int. Cl.
*H04L 12/26* (2006.01)
*G08G 3/00* (2006.01)
*H04L 43/50* (2022.01)
*H04L 43/06* (2022.01)

(52) U.S. Cl.
CPC ............. *H04L 43/50* (2013.01); *G08G 3/00* (2013.01); *H04L 43/06* (2013.01)

(58) Field of Classification Search
CPC .................................. G01S 5/18; H04W 84/18
USPC ........................................................ 340/988
See application file for complete search history.

(56) References Cited

U.S. PATENT DOCUMENTS

| 6,028,823 A * | 2/2000 | Vincent .................. G01C 13/00 367/43 |
| 9,100,317 B1 * | 8/2015 | Xia ....................... H04W 84/18 |
| 2014/0297091 A1 * | 10/2014 | Itoi ......................... H04Q 9/00 701/24 |
| 2015/0134184 A1 * | 5/2015 | Takeda ................. G06Q 50/02 701/24 |
| 2019/0055715 A1 * | 2/2019 | Wei ........................ E02F 3/841 |

OTHER PUBLICATIONS

The Navy Unmanned Undersea Vehicle (UUV) Master Plan. Nov. 2004. https://www.navy.mil/navydata/technology/uuvmp.pdf.

* cited by examiner

*Primary Examiner* — Fabricio R Murillo Garcia
(74) *Attorney, Agent, or Firm* — Sand, Sebolt & Wernow LPA; Gary McFaline

(57) ABSTRACT

A self-localizing autonomous underwater vehicle swarm that is operable to accurately localize each individual unit within the swarm while only requiring a single node at a known location to do so. The methods described herein can localize all members of a swarm with minimal, if any, effect on the size, weight, power, and cost of a system.

20 Claims, 5 Drawing Sheets

METHOD FOR SELF-LOCALIZING OF AN AD HOC NETWORK OF IN-WATER SYSTEMS

TECHNICAL FIELD

The present disclosure relates generally to the use and operation of autonomous vehicles. More particularly, the present disclosure relates to the use and operation of vehicles including autonomous vehicles (AVs) in turbid, visually obscured, and/or navigationally-challenging conditions in underwater environments, air and space environments, or terrestrial environments, both on land or underground. Specifically, the present disclosure relates to the use and operation of autonomous, piloted, or a combination of autonomous and piloted systems, which are capable of self-localizing with a single node in a known location.

BACKGROUND

Improvements in autonomous vehicle technology have allowed the advancement of research and/or operations carried out in extreme or difficult to access environments. These environments may include small, remote, and/or dangerous terrestrial, subterranean, aerial, space, and/or aquatic environments, including both in and on-water situations. These advances in autonomous vehicle technology, particularly in underwater environments, have allowed better access to areas in turbid, visually obscured, and/or navigationally-challenging conditions.

Applications of autonomous vehicle technology in underwater environments may include the use of sonar or other acoustic communications to perform such tasks as sea floor mapping, detecting both natural and introduced objects in the water, locating shipwrecks, tracking wildlife, and the like. It is becoming more common to use autonomous underwater vehicles (AUVs) in an ad hoc network, forming a pack or swarm of AUVs, which the swarm being in communication with other vehicles, such as remote manned or autonomous vehicles. According to current operational methods, it is common for an aircraft, such as a helicopter or the like, to fly over an in-water area being studied while transmitting and receiving communications and other data between the aircraft and one or more AUVs below. The aircraft commonly employs an optical system, such as a LiDAR system, to search for objects underneath the surface of the water. Projecting LiDAR into the water from an airborne platform creates what is known as a two-way detection problem in that the LiDAR signal scatters and attenuates as it moves deeper into water for impacting an object and reflecting back to the airborne vehicle. As the LiDAR waves return to the vehicle, they again scatter or deflect on the way back up through the water column providing equal signal loss in both directions. The augmentation of the airborne system with one or more AUVs can help attenuate these losses. The AUVs tend to includes one or more surface vehicles and/or sensors that can communicate simultaneously with the aircraft the other deployed AUVs. The deployed AUVs in these aircraft/AUV hybrid systems are typically tracked and/or localized visually from the aircraft itself or by employing one or more towed sonar arrays to localize the AUVs. In shallow clear waters, these types of localization techniques tend to be sufficient, however, as the depth or turbidity of the water increases, it is easy to quickly lose track of one or more AUVs in the system. Additionally, in navigationally challenging waters, it may be difficult or impossible to provide air cover or towed arrays as these areas, by definition, may be difficult to reach or navigate.

Similar considerations apply to other environments, such as multiple airborne vehicles operating over rugged terrain, in urban environments, or in areas with poor Global Positioning System (GPS) reception. Other challenging conditions include multiple surface vehicles (on land or water) in GPS-obscured or GPS-denied conditions, or multiple vehicles travelling in subterranean (caves, tunnels, bunkers, etc.) environments, with communications between vehicles provided by appropriate acoustic, electromagnetic, seismic, or particle radiation.

Further, as technology continues to advance in the field of autonomous vehicles, such swarms of AUVs used in augmenting underwater detection systems can grow in number and become more difficult to track simply due to the size of the swarm. Thus, larger swarms currently require additional resources to localize all of the members of the swarm. Currently, this tends to involve additional surface vehicles towing additional sonar arrays which can slow or impede the navigation through an area of interest. Additionally, each additional sonar array increases the size, weight, power, and cost (SWaP-C) of the overall system as each additional component increases the SWaP-C of the system. Finally, in certain applications, such as anti-submarine warfare, towed sonar arrays can signal to your target (e.g. an opposing force submarine) exactly where you are conducting your operations, thus allowing them to evade detection by avoiding that area, or alternatively, may provide sufficient data for a counter-attack. Similar considerations apply to swarms of airborne, spaceborne, surface, or subterranean systems, or to swarms incorporating a mixture of systems of different types, such as airborne and underwater vehicles.

SUMMARY

The present disclosure addresses these and other issues by providing a self-localizing vehicle swarm that is operable to accurately localize each individual unit within the swarm while only requiring a single node at a known location to do so. The methods described herein can localize all members of a swarm with minimal, if any, effect on the size, weight, power, and cost of a system.

In one aspect, an exemplary embodiment of the present disclosure may provide a method of localizing a swarm comprising: deploying a swarm having at least four nodes into an underwater environment; determining a known location for a first node of the at least four nodes; measuring the distance between each node of the at least four nodes and each of the other nodes of the at least four nodes, including the first node, via the timing of a communications signal sent between each node and each of the other nodes of the at least four nodes; and calculating the position of each node via the distances between each node and each of the other nodes of the at least four nodes. This exemplary embodiment or another exemplary embodiment may further provide wherein the communications signal is an acoustic communications signal. This exemplary embodiment or another exemplary embodiment may further provide continuously timing the communications signal between each node and each of the other nodes of the at least four nodes; and continuously calculating the position of each node via the distances between each node and each of the other nodes of the at least four nodes in real-time. This exemplary embodiment or another exemplary embodiment may further provide wherein the position of each node of the at least four nodes is calculated in three-dimensions. This exemplary embodiment or another exemplary embodiment may further provide wherein one of the three positional dimensions is known for each node of the at least four nodes. This exemplary embodiment or another exemplary embodiment may further provide wherein the known dimension is the depth of each node of the at least four nodes. This exemplary embodiment or another exemplary embodiment may further provide wherein each node of the at least four nodes is an autonomous underwater vehicle (AUV). This exemplary embodiment or another exemplary embodiment may further provide communicating the position of each node of the at least four nodes to a remote receiver outside of the swarm. This exemplary embodiment or another exemplary embodiment may further provide wherein communicating the position of each node of the at least four nodes is accomplished by a central communications node.

In another aspect, an exemplary embodiment of the present disclosure may provide a method of localizing a swarm comprising: deploying a swarm having a plurality of nodes into a mixed-medium environment, wherein at least three nodes of the plurality of nodes are deployed into a first medium of the mixed-medium environment and at least three other nodes of the plurality of nodes are deployed into a second medium of the mixed-medium environment; determining a known location for a first node of the plurality of nodes; measuring the distance between each node of the plurality of nodes deployed into the first medium, each other node deployed into the first medium, and the node with the known location via the timing of a communications signal sent therebetween; measuring the distance between each node of the plurality of nodes deployed into the second medium, each other node deployed into the second medium, and the node with the known location via the timing of a communications signal sent therebetween; and calculating the position of each node of the plurality of nodes via the distances between each node and each of the other nodes of the plurality of nodes. This exemplary embodiment or another exemplary embodiment may further provide wherein the first node is a communications node deployed into a position at a boundary between the first and second mediums, the communications node being operable to communicate with each node of the plurality of nodes deployed into both the first and second mediums. This exemplary embodiment or another exemplary embodiment may further provide wherein the first medium of the mixed-medium environment is an in-water environment, the second medium of the mixed-medium environment is an airborne environment, and wherein the first node is deployed to a surface of a body of water in which at least three nodes of the plurality of nodes is deployed.

In yet another aspect, an exemplary embodiment of the present disclosure may provide a method of localizing a non-cooperative object comprising: deploying a swarm having at least four nodes into an environment containing at least one non-cooperative object having an unknown property; with one or more nodes of the at least four nodes being deployed into a known location; measuring the distance between each node of the at least four nodes and each of the other nodes of the at least four nodes, including the node in the known location via timing a communications signal between each of the at least four nodes; calculating the position of each node by measuring the distances between each node and each of the other nodes of the at least four nodes; detecting a previously unknown non-cooperative object with at least one of the at least four nodes; and determining the location of the non-cooperative object relative to the calculated position of at least one of the at least four nodes. This exemplary embodiment or another exemplary embodiment may further provide wherein determining the location of the object further comprises: measuring the distance between the non-cooperative object and at least one node of the at least four nodes having a line of sight to the non-cooperative object. This exemplary embodiment or another exemplary embodiment may further provide wherein determining the location of the non-cooperative object further comprises: measuring the distance between the non-cooperative object and each node of the at least four nodes having a line of sight to the non-cooperative object. This exemplary embodiment or another exemplary embodiment may further provide communicating the position of the non-cooperative object to remote receiver outside of the swarm. This exemplary embodiment or another exemplary embodiment may further provide continuously timing the communications signal between each node and each of the other nodes of the at least four nodes; continuously calculating the position of each node via the distances between each node and each of the other nodes of the at least four nodes in real-time; and tracking the location of the non-cooperative object relative to at least one of the at least four nodes in real-time. This exemplary embodiment or another exemplary embodiment may further provide wherein the environment is an underwater environment and at least one node of the at least four nodes is an autonomous underwater vehicle (AUV). This exemplary embodiment or another exemplary embodiment may further provide wherein the non-cooperative object is threat object. This exemplary embodiment or another exemplary embodiment may further provide further comprising: continuously timing the communications signal between each node and each of the other nodes of the at least four nodes; continuously calculating the position of each node via the distances between each node and each of the other nodes of the at least four nodes in real-time; tracking the location of the non-cooperative object relative to at least one of the at least four nodes in real-time; and continuously communicating the position of the non-cooperative object to remote receiver outside of the swarm until the threat is avoided.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

DETAILED DESCRIPTION

With general reference to the figures, a self-localizing system of autonomous vehicles is generally shown as reference 8. This system 8 may employ a plurality of autonomous platforms 10 (such as autonomous underwater vehicle (AUV) 10, described below).

Figure 1:
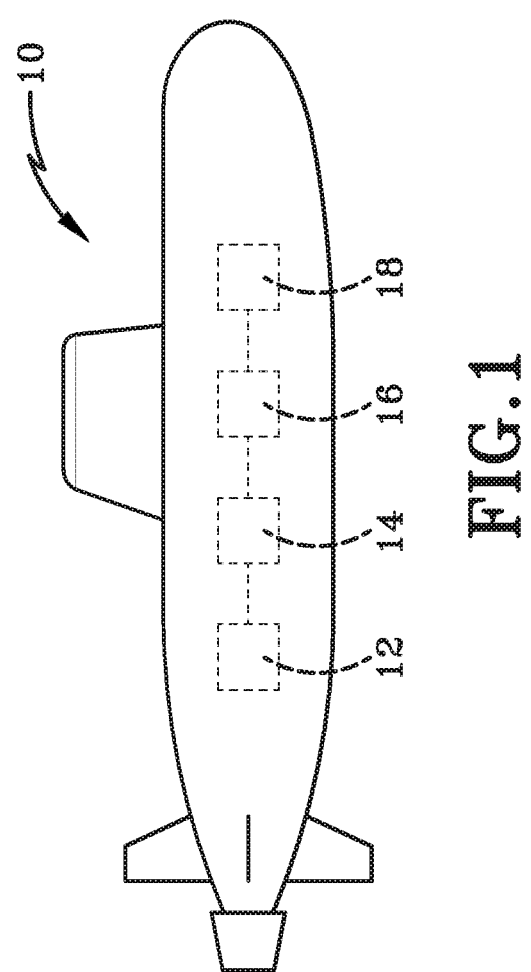
FIG. 1 is an exemplary autonomous underwater vehicle (AUV) depicted as a mini-submarine according to one aspect of the present disclosure.

With reference to FIG. 1, system 8 may employ a plurality of similar or identical platforms 10, as discussed further herein. As shown in FIG. 1, platform 10 may be an exemplary autonomous underwater vehicle (AUV) 10. For purposes of clarity and simplicity in the disclosure, platform 10 is shown and described further herein as a mini-submarine (mini-sub) or other similar AUV 10 capable of carrying the relevant components described below while operating according to the methods presented herein; however, it will be understood that the elements and methods described herein could be carried out in other mediums by other appropriate platforms 10 capable of carrying the required components, including but not limited to surface vehicles, sea-based vehicles, land-based vehicles, space-borne vehicles, and/or airborne vehicles including manned or autonomous and unmanned versions of the like. According to another aspect, platform 10 may be understood to include fixed sensor arrays such as those on a buoy, in a building, or the like. Thus, it will be further understood that references to platform 10 or AUV 10 herein are contemplated to include any suitable platform 10 as dictated by the desired implementation and that AUV 10 is an exemplary model of a platform 10, and not a limiting example thereof.

AUV 10 may generally include a pressure sensor 12, a transmitter 14, a receiver 16, and a processor 18. Although shown in FIG. 1 arranged linearly within AUV 10, pressure sensor 12, transmitter 14, receiver 16 and/or processor 18 may be placed in any configuration as dictated by the desired implementation and need not be arranged linearly or in any particular order.

Pressure sensor 12 may be a standard pressure transducer or depth sensor which may already be installed or otherwise carried by AUV 10. The pressure sensor 12 may be operable to accurately gauge the depth of AUV 10 within the water column based on the pressure the water exerts on pressure sensor 12 as AUV 10 moves vertically up or down within the water column. According to one aspect, pressure sensor 12 may be omitted and the depth of AUV 10, as discussed further below, may be determined according to the methods provided herein. According to another aspect, where AUVs 10 are deployed in other media, pressure sensor 12 may be omitted and replaced with an appropriate gauge or sensor for the medium in which the system is deployed. For example, when AUV 10 is in a vehicle for use in airborne systems, pressure sensor 12 may be replaced with an altimeter.

Transmitter 14 may be operable to transmit electromagnetic signals and may be any type of transmitter, including but not limited to, a communications transmitter, a radar transmitter, a sonar transmitter, an acoustic communicator, or the like. According to one aspect, transmitter 14 may be or include more than one type of transmitter. For example, transmitter 14 may include a communications transmitter, a sonar transmitter, and/or an acoustic communications transmitter. Further according to this aspect, each of these transmitters may be included with AUV 10 as separate units or alternatively may be integral to each other and formed as a single transmitter unit. The specific transmitter configuration and/or specifications may vary according to the desired implementation.

Transmitter 14 may further include or be in communication with one or more antennas (not shown), which may be operable to transmit electromagnetic signals and may include more than one type of antenna including, but not limited to, dual band directional, omni-directional, and the like. According to another aspect, transmitter 14 may include or be in communication with one or more antenna arrays.

Receiver 16 may be operable to receive electromagnetic signals and may include any type of receiver including, but not limited to, radio receivers, sonar receivers, acoustic communications receivers, global navigation receivers, or the like. According to one aspect, receiver 16 may include more than one type of receiver as a separate component or as an integral component thereof. For example, receiver 16 may include a sonar receiver, and acoustic communications receiver, and/or a global navigation receiver.

Receiver 16 may further include or be in communication with one or more antennas, which may be operable to receive electromagnetic signals and may include more than one type of antenna including, but not limited to, dual band directional, omni-directional, and the like. According to another aspect, receiver 16 may include or be in communication with one or more antenna arrays.

According to one aspect, transmitter 14 and receiver 16 may be one or more transceivers, which may be operable to both transmit and/or receive electromagnetic signals and may include one or more types of transmitters and one or more types of receivers therein. Where transmitter 14 and receiver 16 are combined, such as in a transceiver, the antenna(s) and/or antenna arrays may be shared between both transmitting and receiving functions.

Transmitter 14 and/or receiver 16 may be in communication with processor 18 through any suitable wired or wireless connection, which may be a direct connection, a direct serial connection, or a wireless connection. According to another aspect, transmitter 14 and/or receiver 16 may be in communication with processor 18 through intermediate components that may be included or otherwise utilized by AUV 10 according to the desired implementation. For example, transmitter 14 and/or receiver 16 may be in communication with processor 18 by way of one or more frequency converters or the like.

Processor 18 may be one or more processors 18, one or more logics or series of logics, and may include or otherwise be in communication with one or more non-transitory storage mediums. Processor 18 may be a digital processor capable of carrying out and executing a set of instructions or processes encoded thereon. According to one aspect, processor 18 may be operationally connected to other components within AUV 10 as discussed further below. According to another aspect, processor 18 may be remote from the other AUV 10 components and maybe in wired, wireless, or in any suitable combination of wired and wireless communication therewith. The connectivity and communication between other AUV 10 components and processor 18 may therefore vary depending upon the desired implementation and installation parameters of AUV 10 components as discussed herein.

Transmitter 14, receiver 16, and/or processor 18 may be in further communication with other systems onboard AUV 10 such that relevant data may be communicated therebetween. For example, where AUV 10 is realized as a mini-sub, onboard navigation systems may relay data to transmitter 14, receiver 16, and/or processor 18 relating to factors such as bearing, speed, depth, and the like. Similarly, transmitter 14, receiver 16, and/or processor 18 may communicate data to the AUV 10 and including to any operator or operators thereof. Such communication between transmitter 14, receiver 16, and/or processor 18 and other systems of AUV 10 may allow for automated or manual responses to the shared data, such as steering towards or away from a specific location to best fit the needs of AUV 10.

It will be understood that the elements and components of AUV 10 as described herein may be adapted for use with other vehicles including autonomous vehicles not related to underwater operations and may therefore, include, omit or replace any of these components as necessary for the desired implementation. For example, as discussed previously herein, where AUV 10 is a vehicle utilized in an airborne system, pressure sensor 12 may be replaced with an altimeter. It will be further understood that any or all of the components of AUV 10, including AUV 10 itself, may be or include legacy assets or components such that the architecture of AUV 10 may not necessarily be updated or modified, but instead the methods of operation as described further below may be adapted for use with legacy systems and/or legacy assets including legacy versions of AUV 10.

Having thus described the elements and components of an exemplary AUV 10, the operation and methods of use therefore will now be described.

Figure 2:
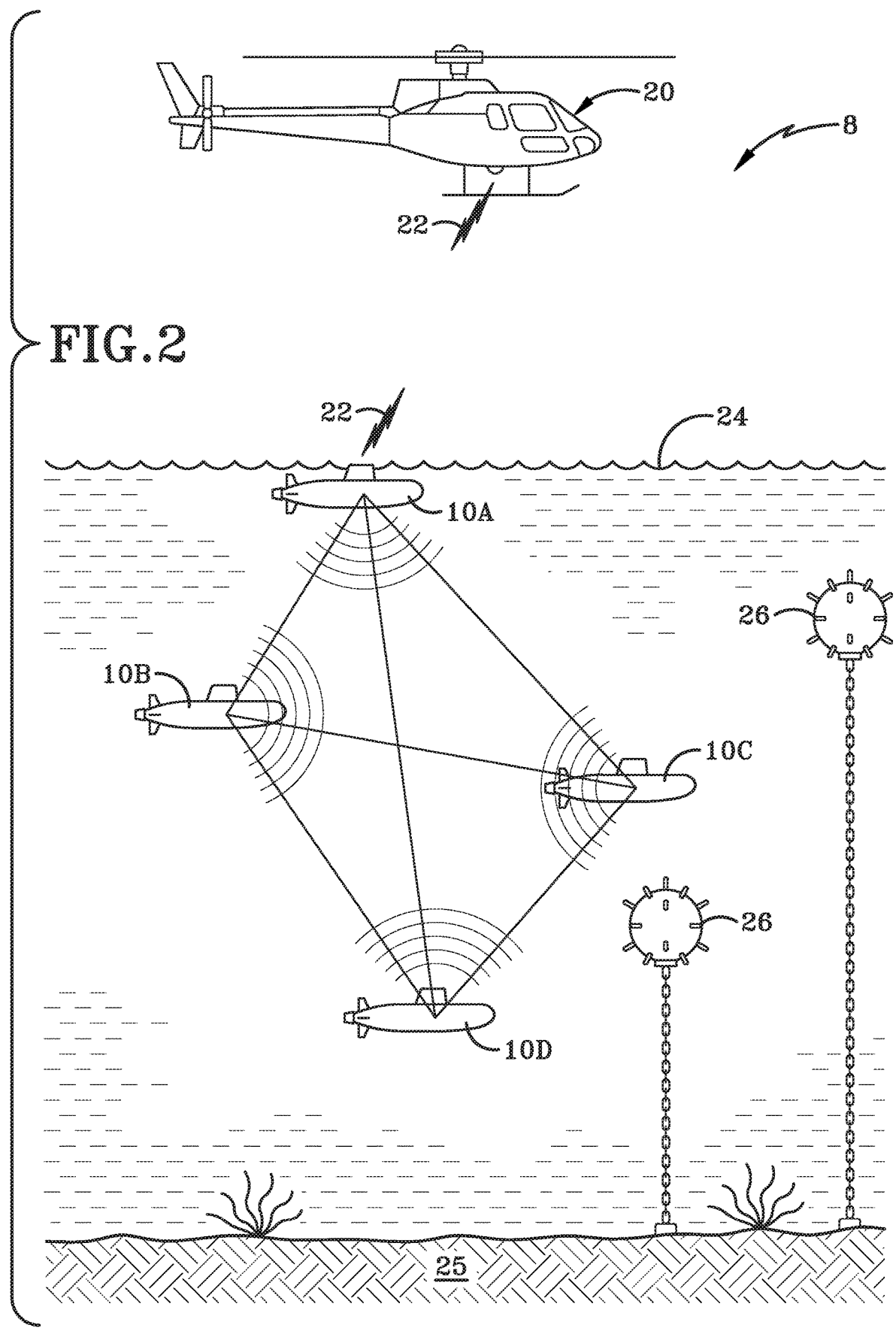
FIG. 2 is an operational view of a small swarm of AUVs as being used for underwater object detection according to one aspect of the present disclosure.

With reference to FIG. 2, an exemplary system 8 is shown utilizing four AUVs, namely AUVs 10A, 10B, 10C, and 10D, along with a related airborne platform, illustrated therein as helicopter 20. It will be understood that helicopter 20 could be any remote unit, including other airborne units, surface units, fixed units, remote installations or the like.

As shown in FIG. 2, system 8 may be utilized wherein AUV 10A may operate at or near the surface 24 of a body of water. This may allow communication signals 22 to be passed back and forth between AUV 10A and helicopter 20. Although shown therein as wireless communication signal 22, it will be understood that different implementations may allow for different communication methods. For example, where remote unit 20 is not a helicopter but is instead a surface vehicle, AUV 10A may have a wired communications connection thereto.

With AUV 10A being operated at or near the surface 24 of the body of water in which system 8 is deployed, its location may be known via global positioning systems (GPS), via its communication link with and/or visibility to helicopter 20, or through any other suitable location method. With the location of AUV 10A known, the unknown locations of AUVs 10B, 10C, and 10D may be determined by timing acoustic communications between each AUV 10 and each of the other AUVs 10. For example, AUV 10B may communicate with AUVs 10A, 10C and 10D as indicated by the lines connecting AUV 10B to the AUVs 10A, 10C, and 10D in FIG. 2. These communications may be linked such that the distance between any two AUVs 10A through 10D may be known based on the time it takes for the signal to travel between any two AUVs 10A through 10D. When an AUV, such as AUV 10B is independently and simultaneously in communication with the AUV 10 having a known location, (i.e. AUV 10A) and with two other AUVs (such as AUVs 10C and 10D in this example), the location of AUV 10B may be calculated based on these time signals.

Once the location of each AUV 10B, 10C and 10D are calculated relative to the known location of AUV 10A, each of the remaining AUVs 10B, 10C and 10D can now be considered localized as their position is known in three dimensional (3D) space. When system 8 is deployed in-water, such as in FIG. 2 this 3D space refers to horizontal positioning both front to back and left and right, as well as their vertical position, i.e. depth, within the water column.

With each AUV 10A through 10D now in a known location, their movements can be coordinated, if desired, and their positions can be used to locate or detect other non-cooperative objects 26 in the area of operation. For example, as shown in FIG. 2, system 8 may be employed to seek non-cooperative objects 26 within the water such as anti-ship mines. It will be understood, however, that a system 8 utilizing multiple AUVs 10 may be used for detecting or localizing almost anything underwater, or may alternatively be used for other objectives including terrain mapping, wildlife tracking, practical applications such as detection of damage to underwater structures like oil rigs or pipelines, for military applications such as the aforementioned mine detection and anti-submarine warfare, or the like. The localization of non-cooperative objects 26 within a medium is discussed further below. For purposes of this disclosure, the term non-cooperative, when used in association with object 26, is understood to mean that the object 26 does not actively or intentionally communicate with AUVs 10 (or with other members or nodes 28 within a swarm 27, as discussed below).

Although shown in FIG. 2 and described therein as AUV 10A, it will be understood as discussed further below that the unit with the known location may be a fixed sensor, or any other suitable sensor, such as a buoy, platform, or the like having a known position. According to one example, a buoy with a known GPS position may be used. This unit with a known location may also include sensors fixed to the bottom surface 25 of the body of water in which the system 8 is deployed. According to another aspect, more than one AUV 10A through 10D or other such complementary sensor may have a known location.

Figure 3:
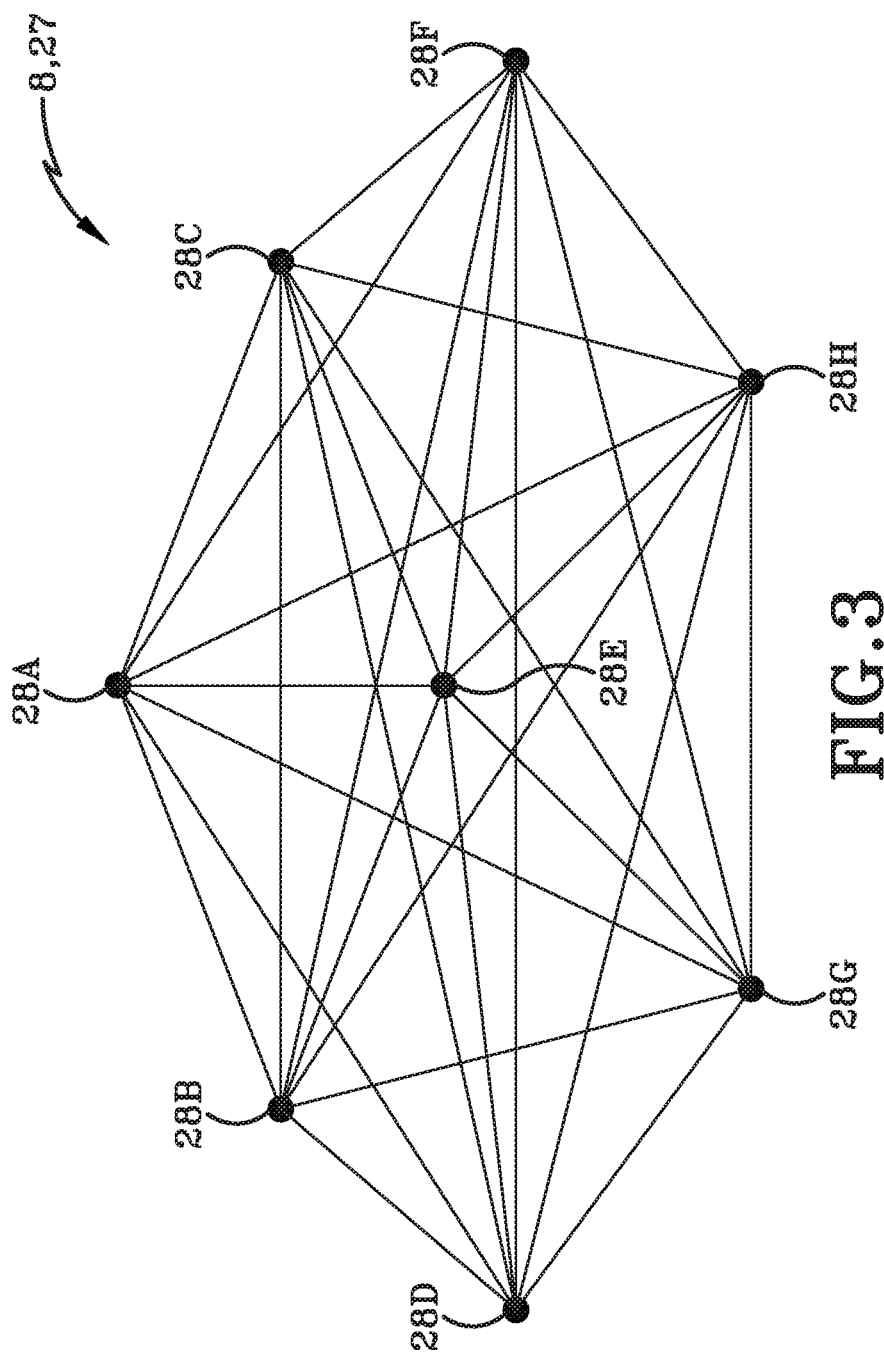
FIG. 3 is a diagrammatic view of the nodes of a swarm communicating and self-localizing relative to each other according to one aspect of the present disclosure.
Figure 4:
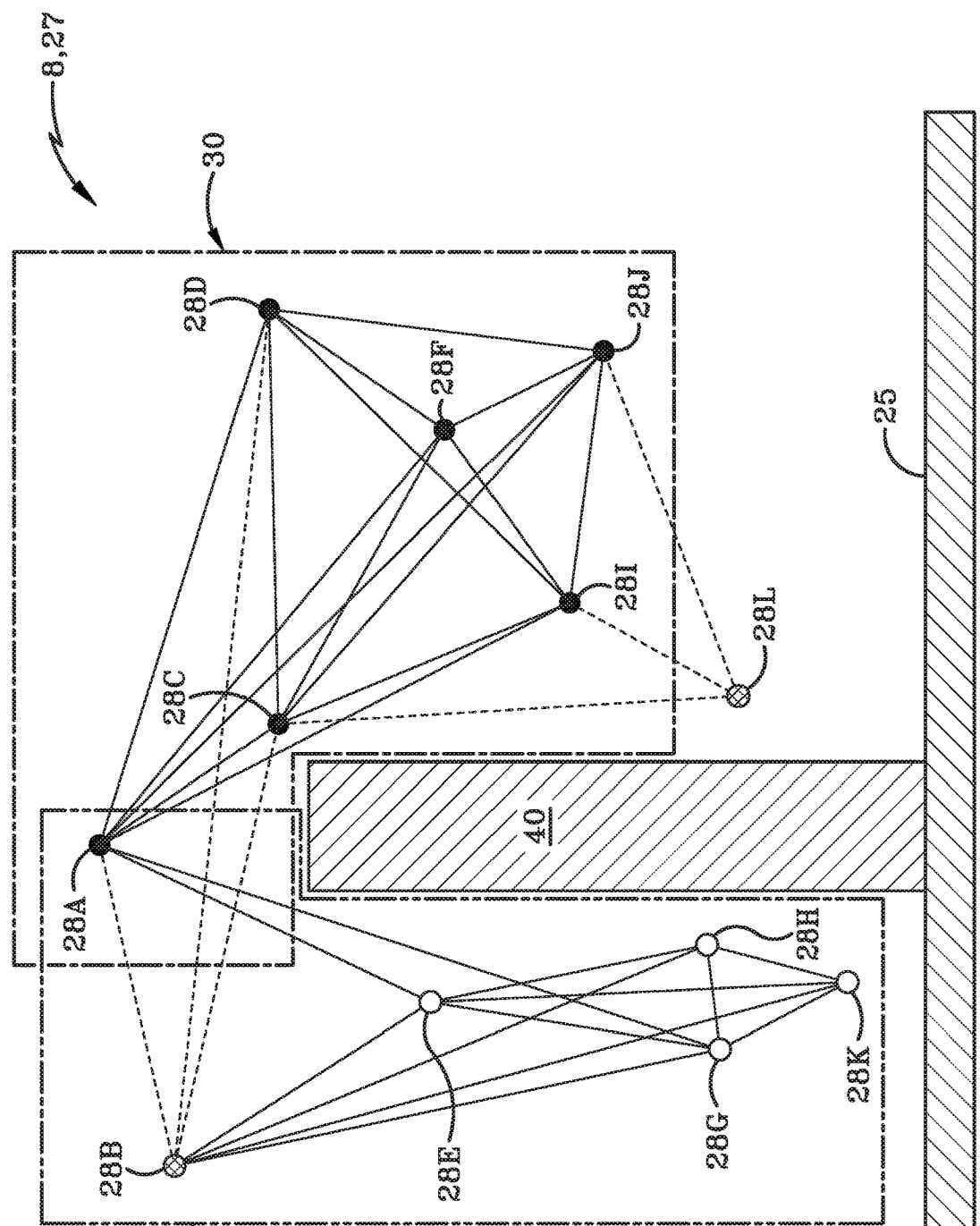
FIG. 4 is a diagrammatic view of a swarm wherein nodes may be separated by an obstacle or object according to one aspect of the present disclosure.

With reference to FIGS. 3 and 4, a system 8 of autonomous vehicles such as AUVs 10 as shown and generally indicated as a swarm 27. Swarm 27 may be made up of a plurality of nodes 28 where each node 28 may represent a single autonomous vehicle, such as AUV 10. Nodes 28 are understood to have the same communications and navigational abilities as an autonomous vehicle such as AUV 10 but will be described generally for the purpose of simplicity and clarity in the present disclosure. A swarm 27 may include any number of nodes 28 and each node may be fully localized according to the methods described herein, provided there are at least four nodes 28 within the swarm 27, with at least one node having a known location. As shown in FIG. 3, node 28A may be a representative node having a known location and may further be, for example, a surface node 28 in communication with an aircraft or satellite, such as helicopter 20 in previous examples. As further shown in FIG. 3, each node 28 within this exemplary swarm 27 is fully localized.

Specifically, as shown, node 28A may have a known location while nodes 28B through 28H may be localized by having communications connections to each of the other nodes within the swarm 27. Thus, as there is the known location of a single node 28A within the swarm 27, the three-dimensional locus $\{x_j, y_j, z_j\}$ for each of $j=0: (N-1)$ nodes 28 may be determined by the separation of each node 28 from its neighbors. When swarm 27 is deployed in an in-water environment, the depth component $\{z_j\}$ may be available from on-board pressure transducers, such as pressure sensor 12, leaving only the horizontal loci $\{x_j\}$ and $\{y_j\}$ to be determined. Then, through the operation of communications timing between each node 28 in the swarm, the separation of each node 28 from its neighbors and from the known locus node 28A (j=0) can be computed. The distances between nodes i (which may be any of nodes 28B through 28H with an unknown locus) and j (i.e. node 28A with a known locus) is given by the time and speed of sound in water c_water:

$$di,j=c\_water*ti,j \quad (Eq.1)$$

Over the typical depths and lateral ranges relevant to underwater object 26 detection, such as counter-mine searches, variability in c_water will be small, so the range equations are approximately isotropic, providing a simple example. Let the primary communications node 28A be designated as node 0, and let its locus (x0, y0, z0) be used as the reference. Then for N nodes 28, the number of unknown coordinates is 2(N−1).

The number of ranges di,j is equal to N(N−1)/2, so that the number of known ranges equals the number of unknown coordinates when:

$$N(N-1)/2=2(N-1), \quad (Eq.2)$$

which is satisfied if N>=4. Localizing all the nodes then reduces to solving the set of non-linear equations:

$$di,j^2=(xi-xj)^2+(yi-yj)^2+(zi-zj)^2 \quad (Eq.3)$$

Because each di,j is sampled twice (for example, d1,2 may differ slightly from d2,1 due to noise), Equation (3) actually represents N(N−1) samples for 2(N−1) unknowns, making it amenable to non-linear least squares (NLSQ) methods, such as the Levenberg-Marquardt algorithm. The processing can be carried out wherever it is most suitable, likely on a central AUV 10 communications node (such as AUV 10A). Over longer ranges (such as for anti-submarine searches), the water may be stratified, in which case the depth sensors 12 allow computation of non-spherical delay-time surfaces for each pair of nodes 28. The mathematics still requires just four nodes 28 to localize the entire swarm 27, given one known node 28 locus (e.g. node 28A). A deployable system 8 will also require multi-path discrimination, which is commonly incorporated into acoustic-communications systems already. Further, the accuracy of all node 28 locations becomes more accurate as the size of the swarm 27 increases.

According to another aspect, as discussed previously herein, where system 8 is deployed in airborne applications, pressure altimetry may be used in place of depth transducers (i.e. pressure sensor 12); however, if pressure altimetry is not sufficiently accurate for a particular mission, then full 3D localization can be accomplished from the node-pair timings. In this case, given one reference node (node 0, e.g. node 28A), there remain 3(N−1) unknowns, and the equations for balancing known timings with unknown loci is:

$$N(N-1)/2 \geq 3(N-1), \quad (Eq.4)$$

which is satisfied if N>=6. That is, if there are at least six nodes 28 collecting & reporting communication times with each other, then the 3-dimensional loci of all nodes 28 can be determined relative to node 0 (node 28A). Localizing all the nodes 28 again reduces to solving Eq.3.

With reference to FIG. 4, a representative swarm 27 having 12 nodes 28A through 28L is shown in a medium containing an obstacle 40. Nodes are divided into clusters, namely a first cluster 30 with all nodes therein fully localized, and a second cluster 32, representing a cluster with partial connections.

Obstacle 40 may be rugged terrain, stratification of the medium such as a temperature stratified water column, or may be any other obstruction that may cause refractive signal blockages between some pairs of nodes 28. In such a deployment, the localization of each node 28 becomes more complex, thus requiring more nodes 28 to affect complete localization.

According to another aspect, obstacle 40 may represent the boundary and/or transition between two different media in which swarm 27 may be deployed. For example, and as discussed further herein, swarm 27 may be deployed into a mixed-medium environment, such as in-water and airborne environments. In this example, obstacle 40 could be the surface of a body of water in which some nodes 28 are deployed and may further represent the transition from water to air. Further according to this example, node 28A may then be deployed at the surface of the body of water and may serve as a central communications node 28. With node 28A serving as a central communications node 28 between two different media, node 28A may further include all necessary equipment to allow communications between nodes 28 deployed in either media. This may include duplicating equipment, e.g. having both acoustic and radio communications equipment. In other implementations, this may involve additional components or resources.

As shown in FIG. 4, the localization status of each node 28 is indicated by the shading level of each node 28. For example, the nodes 28 that are completely shaded, indicated by reference 34, represent nodes that are fully localized as they are connected to both the node 28 with the known locus (node 28A (j=0)) and three other nodes 28 that are likewise connected to node 28A. Nodes 28 with hatch shading, indicated by reference 36, are likewise fully localized; however, they are localized via line of sight with at least three already localized nodes 28. For example, node 28B is fully localized by virtue of its line of sight with nodes 28A, 28C and 28D while node 28L may be fully localized by its line of sight connections with nodes 28C, 28I and 28J. Nodes 28 with no shading, indicated by reference 38, represent nodes 28 with unknown loci which can still become fully localized if the number of unique connections is at least as large as the number of unknown loci x, y, z. In such a scenario as depicted in FIG. 4, the overall group of nodes 28 may be subdivided into groups such as first cluster 30 and second cluster 32 that meet the requirements of either Equation 2 or Equation 4 above. If enough nodes 28 are common between groups, then all members of the groups can be localized. The general formula is given by:

$$N_{Unique\_Pairs\_in\_Cluster} \geq 3(N_{Cluster}-N_{Known\_in\_Cluster}) \quad (Eq.5)$$

where:
$N_{Cluster}$=the number of nodes 28 in the cluster
$N_{Unique\_Pairs\_in\_Cluster}$=the number of unique lines of sight between pairs of nodes 28 in the cluster, and
$N_{Known\_in\_Cluster}$=the number of nodes 28 with known loci, including nodes 28 that may be in common with other clusters.

If the medium in which the nodes 28 operate is stratified (or if nodes 28 are deployed in mixed-medium environments) so that signal speed varies with depth z (or altitude in airborne applications), refractive effects can cause the shortest-time signal path between two nodes 28 to be longer than the direct geometric path. The spherical isochrones become more complicated surfaces of revolution about the z-axis. To compute the isochrones surfaces for a variable index of refraction n(z), divide vertical distance between r and r' into L layers of equal thickness $\Delta z$, and let each layer j, have uniform refractive index $n_j$. Then take the layer thicknesses to zero and the number of layers to ∞, performing a set of integrations. The result is that the time for a signal to transit from depth $z_{Start}$ to depth $z_{Finish}$ depends on an initial ray direction $\theta_{Start}$ via the equation:

$$T(z_{Finish}, z_{Start}, \theta_{Start}) \approx \int_{z_{Start}}^{z_{Finish}} dz \frac{n(z)}{c_0} \frac{1}{\sqrt{1 - \sin^2\theta_{Start}[(n(z_{Start})/n(z))]^2}}, \quad (1)$$

with $$n(z) \geq n(z_{Start})|\sin\theta_{Start}| \quad (2)$$

where $c_0$ is the speed of signal in the nominal un-stratified medium, and <n> is the mean refractive index, relative to the nominal un-stratified medium, between depths $z_{Start}$ and $z_{Finish}$. Equation (1) establishes a relationship between T and $|\theta_{Start}|$ for each pair of node depths. The lateral distance between the nodes is then given by substituting the value of $\theta_{Start}(T)$ into:

$$\rho(z_{Finish}, z_{Start}, \theta_{Start}) \approx \quad (3)$$

$$\sin\theta_{Start} n(z_{Start}) \int_{z_{Start}}^{z_{Finish}} dz \frac{1}{\sqrt{n^2(z) - n^2(z_{Start})\sin^2\theta_{Start}}},$$

where ρ is the horizontal distance:

$$\rho(z_{Finish}, z_{Start}) = \sqrt{(x_{Finish} - x_{Start})^2 + (y_{Finish} - y_{Start})^2}. \quad (4)$$

The procedure for computing a set of isochronic surfaces is to start at $z_{Finish} = z_{Start}$, and increase (or decrease) $z_{Finish}$ for each angle $\theta_{Start}$ until reaching either an ending depth or a turning point. (There are no connections between zStart and $z_{Finish}$ past a turning point.) A turning point occurs when the rays have turned into a horizontal direction, which happens under the condition that:

$$n(z) = n(z_{Start})|\sin\theta_{Start}| \quad (5)$$

The intersections of the isochrones with the plane $z_{Finish} = z_{Start}$ is given by $\theta_{Start} = \pi/2$ radians, and circles of radius:

$$\rho(T, z_{Finish} = z_{Start}) = \frac{c_0}{n(z_{Start})} T \quad (6)$$

In utilizing the timing of acoustic communications between nodes 28 within a swarm 27, as described herein, avoids the need for towed sonar arrays which can slow or impede navigation to localize each node 28 within the swarm 27. Further, only one node 28 needs to be at a known position, thus, remaining nodes 28 within the swarm 27 need not necessarily carry extra hardware or components to allow their position to be independently determined but for using the acoustic communications methods described herein. Additionally, as acoustic communication equipment and pressure sensors are standard equipment on most autonomous undersea platforms the methods described herein have minimal, if any, impact on the size, weight, power and cost (SWaP-C) of system 8 as system 8 may utilize legacy AUVs 10 or similar vehicles.

According to one aspect, the localization of nodes via acoustic communications may be continuously updated via an open and/or dynamic link between each node 28 within swarm 27 such that as each node 28 moves relative to the node 28A having the known locus and relative to the other nodes 28 within the swarm 27, its position may be dynamically and in real time calculated and localized.

Figure 5:
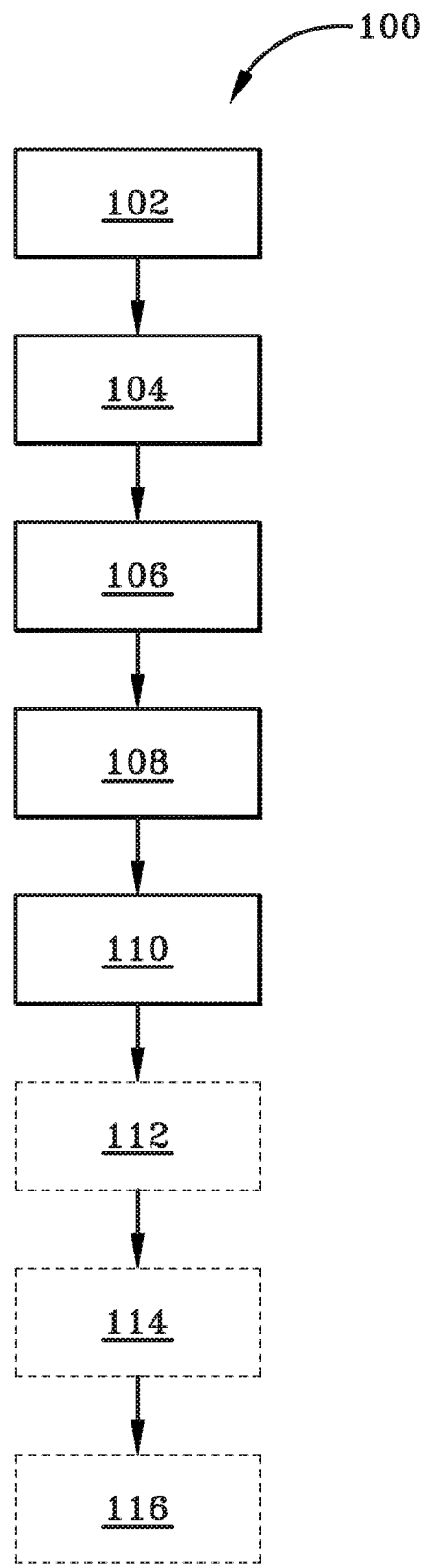
FIG. 5 is an exemplary flow chart illustrating a method of operation and use for a self-localizing swarm according to one aspect of the present disclosure.

With reference now to FIG. 5, an exemplary flow chart is shown illustrating and exemplary method of use for a system 8 utilizing multiple nodes 28 within a swarm 27 to both localize each node 28 within the swarm 27 and to detect, locate, or otherwise localize an underwater object 26. This method is indicated generally as process 100 and may generally describe or instruct the operation and use of system 8 including the localization of nodes 28 in swarm 27.

Accordingly, the first step in process 100 illustrated in FIG. 5 as step 102 is to deploy a swarm 27 having at least four nodes 28 into an environment. As deploying or once deployed, these nodes 28 will begin to move about within the environment. As the nodes 28 move about within the environment, at least one node 28 will be positioned or otherwise determined to have a known location. The determination of the known location of such a first node 28, such as node 28A, is shown and generally indicated as step 104 and may be accomplished utilizing any suitable location finding method including, but not limited to, GPS, visualize confirmation, latitude and longitudinal coordinates, satellite link, triangulation, or any other suitable location method.

With the swarm 27 deployed and the location of a first node 28A is determined, each of the remaining nodes 28 may be simultaneously transmitting and receiving communication signals from each of the other nodes 28 including first node 28A and the time it takes for these communications to be received at each individual node 28 may allow the distance between each of the remaining nodes 28 and the first node 28A to be measured. The measurement of this distance between nodes 28 and node 28A is generally indicated as step 106 in process 100. Simultaneously, the distance between each of the remaining nodes 28 relative to each other node 28 may be measured via the timing of communications between each node 28 pair within the swarm 27. The measuring of distance between each of the remaining nodes is indicated as step 108 in process 100.

Once the distance between each node 28 and the first node 28A, as well as the distance between each node 28 and the distance to each of the other nodes 28, is determined as in steps 106 and 108, the position of each node 28 in the swarm 27 may be calculated according to the formulas presented above. Thus each node 28 within the swarm 27 may be localized provided the swarm 27, again, has at least four nodes 28 with the location of the first node 28A being known.

Process 100 may further provide that the calculated position each node 28 within the swarm may be further communicated remotely to another system or person such as the related vehicle, for example helicopter 20, or to an operator or operators thereof, as desired. This optional step of communicating node 28 positions away from the swarm 27 is indicated as step 112 in process 100 and is rendered in a dashed line box indicating the optional nature of step 112.

Similarly, steps 114 and 116 are also optional and may be additional steps that may be utilized as part of process 100 when the swarm 27 is employed in detection of non-cooperative objects such as objects 26 in FIG. 2. When used as such, or in similar applications, process 100 may further include the step of detecting a non-cooperative object via one or more sensors on one or more nodes 28 within the swarm, which may be accomplished through known means including, but not limited to, visual detection, remote sensing, sonar detection, or the like. Where swarm 27 is employed in a medium other than water, this may include other detection methods such as radar or other similar detection protocols as dictated by the specific implementation. The step of detecting an object is indicated as optional step 114 in process 100.

As the node 28 locations are all known via the localization portion of process 100, the object 26 detected in step 114 may be generally located based on its relative position compared to the node 28 which detected the object. For example, with reference to FIG. 2, if AUV 10C first detects an object 26, the general location of the object may be determined by its relative position to AUV 10C.

If multiple nodes 28 within the swarm independently detect the object 26, the object 26 may be localized similarly to one of the nodes 28, provided a sufficient number of nodes detect or have a line of sight to that object 26. For example, with continued reference to FIG. 2, if nodes 10B, 10C and 10D all detect the same object 26, the object 26 may be localized to its precise three dimensional position relative to these three nodes as its position can be triangulated based on the known position of AUVs 10B, 10C and 10D. The localization either generally or specifically is indicated as optional step 116 in process 100.

Although not indicated as a specific step in process 100, it is contemplated that the localization of nodes 28 within swarm 27 may be performed on a continuous basis, and may be calculated and/or updated dynamically in real-time. This may provide for a constant location tracking of both nodes 28 and non-cooperative objects 26 as provided herein.

According to one aspect, where a non-cooperative object 26 is considered to be a threat to one or more nodes 28 within a swarm 27, or to other units, personnel, or the like operating in the area, the swarm 27 may communicate the position of the non-cooperative object 26 to other receivers remote from the swarm 27 and may do so continuously and in real-time until the threat posed by the non-cooperative object is avoided, either through movement of the threatened unit, or through the disablement and/or destruction of the object 26. For example, where non-cooperative object 26 is an anti-ship mine, as depicted in FIG. 2, swarm 27 may locate and communicate the position of the mine to a mine clearing unit, which may then maneuver into position to disable or destroy the mine. In this example, swarm 27 may continuously track the mine and communicate its position until the mine is disabled or destroyed. According to another aspect of this example, swarm 27 may continuously track and communicate the position of the mine to other units to permit those units to take action to avoid the mine.

As discussed previously herein, it will be specifically understood that nodes 28 may be AUVs 10 as used in underwater applications as described herein; however, it is again explicitly understood that these nodes 28 may be any suitable vehicle, sensor array or the like and may include autonomous vehicles, manned vehicles, remotely operated vehicles, or the like, and these vehicles may be operable in any suitable environment including, but not limited to, underwater, at the surface of the water, airborne environments, land-based environments, or any other environment as dictated by the desired implementation. It will be further understood that nodes 28 may include fixed sensor positions, such as those affixed to a specific location either on land, at the surface 24 of a body of water, or affixed to the bottom surface 25 of a body of water. Similarly, where nodes 28 are deployed in other applications, fixed sensors and/or sensors having a known location may be substituted with any suitable sensor array or vehicle.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A computer program product including one or more non-transitory machine-readable mediums encoded with instructions that when executed by one or more processors cause a process to be carried out for localizing a swarm comprising:
providing the swarm having at least four nodes into a mixed-medium environment, wherein at least three of the at least four nodes are provided into a first medium of the mixed-medium environment and at least one of the at least four nodes is provided into a second medium of the mixed-medium environment, said mixed-medium environment consisting of at least two different mediums consisting of air, water, liquid, land, or space;
determining a known location for a first node of the at least four nodes;
measuring a distance between each node of the at least three nodes provided into the first medium of the mixed-medium environment and each of the at least one node provided into the second medium of the mixed-medium environment, via a timing of a communications signal sent between the first node and each of the other nodes of the at least four nodes; and
calculating a three dimensional position of each node via the distances between the first node and each of the other nodes of the at least four nodes and a depth component from a pressure sensor on at least one node wherein each node of the at least four nodes is divided into a group of localized or unlocalized nodes;
said group of localized nodes comprising nodes that are connected to a known locus with three other nodes likewise connected to the known locus or nodes localized via line of sight with at least three already localized nodes; and
said group of unlocalized nodes comprising nodes of unknown loci which are localized when a number of unique connections is at least as large as a number of unknown loci.

2. The computer program product of claim 1 wherein the communications signal used in the first medium of the mixed-medium environment is an acoustic communications signal.

3. The computer program product of claim 1 further comprising:
continuously timing the communications signal between the first node and each of the other nodes of the at least four nodes; and
continuously calculating the position of each node via the distances between the first node and each of the other nodes of the at least four nodes in real-time.

4. The computer program product of claim 1 wherein the at least three of the at least four nodes is an autonomous underwater vehicle (AUV).

5. The computer program product of claim 1 further comprising:
communicating the three dimensional position of each node of the at least four nodes to a remote receiver outside of the swarm.

6. The computer program product of claim 1, wherein the at least four nodes are configured to transmit electromagnetic signals from at least one of sonar, acoustic and radar.

7. The computer program product of claim 1, wherein the at least four nodes are configured to receive electromagnetic signals from at least one of sonar, acoustic and navigation systems.

8. A method of localizing a swarm of nodes comprising:
providing the swarm of nodes into a mixed-medium environment, wherein at least three nodes of the swarm of nodes are deployed into a first medium of the mixed-medium environment and at least three other nodes of the plurality of nodes are deployed into a second medium of the mixed-medium environment, wherein the mixed-medium environment consists of at least two different mediums consisting of air, water, liquid, land, or space;
determining a known location for a first node of the plurality of nodes;
measuring a distance between each node of the plurality of nodes deployed into the first medium, each other node deployed into the first medium, and the first node with the known location via a timing of a communications signal sent between each node and each other node of the plurality of nodes;
measuring a distance between each node of the plurality of nodes deployed into the second medium, each other node deployed into the second medium, and the first node with the known location via the timing of the communications signal sent between each node and each other node of the plurality of nodes; and
calculating a position of each node of the plurality of nodes via the distances between each node and each of the other nodes of the plurality of nodes wherein each node of the plurality nodes is divided into a group of localized or unlocalized nodes;
said group of localized nodes comprising nodes that are connected to a known locus with three other nodes likewise connected to the known locus or nodes localized via line of sight with at least three already localized nodes; and
said group of unlocalized nodes comprising nodes of unknown loci which are localized when a number of unique connections is at least as large as a number of unknown loci.

9. The method of claim 8 wherein the first node is a communications node deployed into a position at a boundary between the first and second mediums, the communications node being operable to communicate with each node of the plurality of nodes deployed into both the first and second mediums.

10. The method of claim 9 wherein the first medium of the mixed-medium environment is an in-water environment, the second medium of the mixed-medium environment is an airborne environment, and wherein the first node is deployed to a surface of a body of water in which at least three nodes of the plurality of nodes is deployed.

11. The method of claim 8 wherein one of the first medium is water and further comprising detecting a non-cooperative object with at least one node using at least one sensor, wherein the at least one sensor provides visual detection, sonar detection, or radar detection; and determining a location of the non-cooperative object relative to the at least one node.

12. The method of claim 11 wherein determining the location of the at least one non-cooperative object further comprises:
measuring a distance between the at least one non-cooperative object and at least one node of the at least four nodes having a line of sight to the at least one non-cooperative object.

13. The method of claim 11 wherein determining the location of the at least one non-cooperative object further comprises:
measuring a distance between the at least one non-cooperative object and each node of the at least four nodes having a line of sight to the at least one non-cooperative object.

14. The method of claim 11 further comprising:
communicating a position of the at least one non-cooperative object to remote receiver outside of the swarm.

15. The method of claim 11 further comprising:
continuously timing the communications signal between each node and each of the other nodes of the at least four nodes;
continuously calculating the position of each node via the distances between each node and each of the other nodes of the at least four nodes in real-time; and
tracking the location of the at least one non-cooperative object relative to at least one of the at least four nodes in real-time.

16. The method of claim 11 wherein the first medium of the multi-medium environment is an underwater environment and at least one node of the at least four nodes is an autonomous underwater vehicle (AUV).

17. The method of claim 16 wherein the at least one non-cooperative object is a threat object.

18. The method of claim 17 further comprising:
continuously timing the communications signal between each node and each of the other nodes of the at least four nodes;
continuously calculating the position of each node via the distances between each node and each of the other nodes of the at least four nodes in real-time;
tracking the location of the at least one non-cooperative object relative to at least one of the at least four nodes in real-time; and
continuously communicating the position of the non-cooperative object to remote receiver outside of the swarm until a threat is avoided.

19. The method of claim 11, calculating a three dimensional position of each node via the distances between each of the first node and each of the other nodes of the at least four nodes and a depth component from a pressure sensor on at least one node.

20. The method of claim 8, wherein at least one of the first and second medium environment is a stratified medium and further comprising computing isochronic surfaces for a variable index of refraction when measuring the distance between each node of the plurality of nodes in the stratified medium.

* * * * *